US010663930B2

(12) United States Patent
Becker et al.

(10) Patent No.: US 10,663,930 B2
(45) Date of Patent: May 26, 2020

(54) CONTROL OF AIRCRAFT SYSTEMS WITH AT LEAST TWO REMOTE DATA CONCENTRATORS FOR CONTROL OF AN AIRCRAFT SYSTEM COMPONENT

(71) Applicants: Airbus Operations GmbH, Hamburg (DE); Herbert Holzmann, Kirchdorf (DE)

(72) Inventors: Christian Becker, Hamburg (DE); Jan Bartelmann, Hamburg (DE); Herbert Holzmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 499 days.

(21) Appl. No.: 14/872,268

(22) Filed: Oct. 1, 2015

(65) Prior Publication Data

US 2016/0018793 A1     Jan. 21, 2016

Related U.S. Application Data

(63) Continuation of application No. PCT/EP2014/057059, filed on Apr. 8, 2014.

(30) Foreign Application Priority Data

Apr. 9, 2013 (EP) .................................... 13162866

(51) Int. Cl.
*G05B 9/03* (2006.01)
*H04L 12/40* (2006.01)
(Continued)

(52) U.S. Cl.
CPC ........... *G05B 9/03* (2013.01); *G05B 19/0423* (2013.01); *H04L 12/40176* (2013.01);
(Continued)

(58) Field of Classification Search
CPC . G05B 9/03; G05B 19/0423; H04L 12/40176; H04L 67/125
See application file for complete search history.

(56) References Cited

U.S. PATENT DOCUMENTS

| 6,604,030 B1 | 8/2003 | Davis et al. | |
| 2003/0047997 A1* | 3/2003 | Bernier | B64D 41/00 307/9.1 |

(Continued)

FOREIGN PATENT DOCUMENTS

| WO | 2012038265 | 3/2012 |
| WO | 2012038266 | 3/2012 |

OTHER PUBLICATIONS

International Search Report, dated Apr. 24, 2014.

*Primary Examiner* — Donald J Wallace
(74) *Attorney, Agent, or Firm* — Greer, Burns & Crain Ltd.

(57) ABSTRACT

A central processing unit for control of an aircraft system provided on board an aircraft, a control network for control of the aircraft system, an aircraft comprising such a control network, a corresponding method for control of the aircraft system and a computer program for carrying out the method. The central processing unit is connectable to at least two remote data concentrators over a network connection for control of a system component of an aircraft system. The central processing unit is configured to select one of the at least two remote data concentrators for control of the system component and to instruct the selected remote data concentrator to control the system component.

13 Claims, 3 Drawing Sheets

(51) Int. Cl.
    *H04L 29/08*     (2006.01)
    *G05B 19/042*    (2006.01)
    *G06F 11/20*     (2006.01)

(52) U.S. Cl.
    CPC .. *H04L 67/125* (2013.01); *G05B 2219/25032* (2013.01); *G06F 11/202* (2013.01); *H04L 67/12* (2013.01); *H04L 2012/4028* (2013.01)

(56) References Cited

U.S. PATENT DOCUMENTS

| | | | |
|---|---|---|---|
| 2006/0019594 A1* | 1/2006 | Horner | B64D 13/02 454/74 |
| 2006/0062143 A1* | 3/2006 | Bibby | G05D 1/0077 370/225 |
| 2006/0198737 A1 | 9/2006 | Matsui et al. | |
| 2008/0208361 A1 | 8/2008 | Grgic | |
| 2009/0187293 A1* | 7/2009 | Trotter | B64C 25/26 701/16 |
| 2009/0243895 A1* | 10/2009 | Mitchell | H01Q 1/007 340/971 |
| 2010/0070150 A1 | 3/2010 | May | |
| 2010/0100259 A1* | 4/2010 | Geiter | G06N 5/045 701/3 |
| 2011/0040466 A1* | 2/2011 | Hill | B60T 8/1703 701/74 |
| 2012/0101663 A1* | 4/2012 | Fervel | B64C 13/42 701/3 |
| 2012/0233495 A1* | 9/2012 | Einig | G06F 11/1658 714/4.5 |
| 2012/0296496 A1* | 11/2012 | Hedrick | G08G 5/0021 701/3 |
| 2013/0169036 A1 | 7/2013 | Todd et al. | |
| 2013/0173828 A1 | 7/2013 | Todd et al. | |

* cited by examiner

CONTROL OF AIRCRAFT SYSTEMS WITH AT LEAST TWO REMOTE DATA CONCENTRATORS FOR CONTROL OF AN AIRCRAFT SYSTEM COMPONENT

CROSS-REFERENCES TO RELATED APPLICATIONS

This application is a continuation of International Application PCT/EP2014/057059 filed Apr. 8, 2014, designating the United States and published on Oct. 16, 2014 as WO 2014/166949. This application also claims the benefit of the European patent application No. 13162866.1 filed on Apr. 9, 2013. The entire disclosures of the above are incorporated herein by way of reference.

BACKGROUND OF THE INVENTION

The present invention relates to a central processing unit for control of an aircraft system provided on board an aircraft, a control network for control of the aircraft system, an aircraft comprising such a control network, a corresponding method for control of the aircraft system and a computer program for carrying out the method.

Automation and control of aircraft systems, like aircraft ventilation systems, aircraft cooling systems or any other aircraft system that is suitable to be controlled via central processing units, control networks and common remote data concentrators, are generally performed by use of software (S/W) programmable controllers. In case of aircraft ventilation systems, today's solutions for automation and control are based on dedicated centrally located controllers, which are specifically developed for the system to be controlled. In other words, such centrally located controllers are specifically developed for controlling only a specific type of components, e.g., a specific type of sensors and/or actuators. That is, in case of aircraft ventilation systems, such centrally located controllers are specifically developed for controlling only ventilation system components of the installed aircraft ventilation system rather than system components of other aircraft systems.

In other words, these controllers fulfill all individual requirements for automation and control of the specific ventilation system installed on the aircraft and its electric and electronic components and are only foreseen and suitable to be used within one dedicated aircraft program. This is also true for controllers of many other aircraft systems, so that a lot of different system specific and individually developed controllers are typically used on one aircraft type. Hence, airlines typically need to keep a big number of different controllers that are used on a specific aircraft in their spare parts stores.

Due to existing safety and reliability requirements, automation and control of aircraft systems like aircraft ventilation systems needs to be set up redundantly so that many different important and safety-critical functions can always be guaranteed in case of one failed controller entity. For this reason, controllers used for controlling aircraft systems, for instance, aircraft ventilation system controllers for control of aircraft ventilation systems, are presently developed as dual-lane controllers. Dual-lane controllers host two independent and redundant controller lanes, e.g., a dual-lane controller typically has two independent processors and memories for performing independent control operations. The two independent control lanes can communicate with each other. That is, for example, the processor of the first control lane can not only read out instructions, commands and data stored in a specific area of the first control lane's memory, but also of the memory in the second control lane and vice versa. Such dual-lane controllers are typically connected to central process computers by Controller Area Network (CAN) busses.

Each dual-lane controller is typically not only connected to central process computers but also to multiple system components which are to be controlled. Electrical connections between the dual-lane controllers and the system components (e.g., electric system components) must often bridge long distances within the aircraft fuselage depending on the components' specific locations. The decision which of the lanes of the dual-lane controllers is used for the control of the system components to which the dual-lane controller is connected is generally performed by the dual-lane controller itself, e.g., the two lanes of the dual-lane controllers typically communicate with each other to decide which lane should be responsible for control the system component(s) at a certain point of time.

Recently, generic, single-lane and S/W configurable data concentrators, so called Common Remote Data Concentrators (CRDCs), have been developed. These generic, single-lane data concentrators can be connected via an Avionics Full DupleX (AFDX™) switched Ethernet network connection or other network connections to a common avionics data communication network for communication with further computers and data concentrators. The CRDCs can not only be used for monitoring and controlling specific aircraft system components, e.g., ventilation system components, but can adaptively be configured for monitoring and controlling system components of other aircraft systems.

In WO 2012/038265 A1 a remote data concentrator (RDC) for an avionics network has been proposed. The RDC comprises an input/output interface (I/O) for connection to one or more input/output devices, and a network interface for connection to a remote processor. The RDC is operable to provide communication between the input/output device(s) and the remote processor, and the RDC comprises a set of instructions for autonomously driving an output device connected to the I/O.

SUMMARY OF THE INVENTION

It is an object of the present invention to provide a central processing unit and a method for control of an aircraft system provided on board an aircraft, a control network having such a central processing unit, an aircraft having such a control network and a computer program for carrying out the method, by means of which control of the aircraft system can be reliably performed.

According to a first aspect, a central processing unit for control of an aircraft system provided on board an aircraft is provided. The central processing unit is connectable to at least two remote data concentrators over a network connection for control of a system component of an aircraft system. The central processing unit is configured to select one of the at least two remote data concentrators for control of the system component and to instruct the selected remote data concentrator to control the system component.

In accordance therewith, the central processing unit may not only be responsible for selecting one of the at least two remote data concentrators for control, but also for instructing the selected remote data concentrator which control operation is to be performed in order to control the system component.

The at least two remote data concentrators may be any kind of generic, single-lane and software (S/W) configurable data concentrator or controller. In this context, the term "generic" may be understood in such a way that the data concentrator is not only configured to control system components of one specific aircraft system, e.g., an aircraft ventilation system, but is also configured to control system components of other aircraft systems (other systems typically used on an aircraft). As the remote data concentrators are generic, they are not designed for the single purpose to automate and control a ventilation system. Further, the term "S/W configurable" may mean that the operation of the data concentrator may be adjusted by means of software. For example, the S/W configurable data concentrator may be adjusted by software to be used for controlling system components of different aircraft systems. As the remote data concentrators are S/W configurable, different available input and output interfaces of each remote data concentrator may be arbitrarily activated and assigned for specific use by aircraft systems. Still further, the term "single lane" may be understood in that the data concentrator or controller has only one control lane, e.g., only one processor and only one memory for performing control operations.

The selection of the one of the at least two remote data concentrators may be performed repeatedly or periodically. In case of periodic selection, any possible clock cycle may be used which may be dependent on the system component connected to the remote data concentrators. For example, dependent on what kind of system component is connected to the at least two remote data concentrators, the clock cycle may be in the range of several microseconds, in the range of several seconds, or even one or more minutes. For example, in case of the system component being a valve, the clock cycle may lie between 50 ms and 150 ms, e.g., a clock cycle of 100 ms or the like may be used. In case of the system component being a temperature sensor, the clock cycle may be (much) higher, e.g., the clock cycle may be a few or several seconds or even one or more minutes. Just to give an exemplary value, a clock cycle of 50 s may be used for a temperature sensor. Likewise the central processing unit may repeatedly, continuously or periodically monitor at least one of the availability, performance and functioning of the at least two remote data concentrators. In case of periodic monitoring, any possible clock cycle as set forth above may be used. For this purpose, the central processing unit may repeatedly, continuously or periodically command the at least two remote data concentrators to provide information about their availability, performance and/or functioning.

According to a first possible realization of the central processing unit according to the first aspect, the central processing unit may be configured to select the one of the at least two remote data concentrators for control of the system component by considering power supply characteristics of the at least two remote data concentrators. For example, the central processing unit may be configured to select the one of the at least two remote data concentrators for control of the system component by considering which of the at least two remote data concentrators has the most robust power supply. It is conceivable that only one of the at least two remote data concentrators is supplied by the normal power supply, while the other(s) of the at least two remote data concentrators is/are supplied by an emergency power supply. In this case, the central processing unit may be configured to select the one of the at least two remote data concentrators for control of the system component which is connected to the normal power supply. In case of failure of the normal power supply, the other(s) of the at least two remote data concentrators may be selected.

According to a second possible realization of the central processing unit according to the first aspect, which may be implemented independent from or in combination with the first possible realization of the central processing unit according to the first aspect, the central processing unit may be configured to select the one of the at least two remote data concentrators for control of the system component by considering availability of the at least two remote data concentrators. For example, it may be determined or detected by the central processing unit that one or more of the at least two remote data concentrators are (currently) not available. In this case, the central processing unit may select one of the other(s) of the at least two remote data concentrators, i.e., one of the available remote data concentrators.

The central processing unit may be configured to instruct the selected remote data concentrator to control the system component by commanding the selected remote data concentrator to enter or maintain an active state and by commanding the remaining of the at least two data concentrators to enter or maintain an inactive state. In other words, the central processing unit may be configured to generate and transmit an activation signal to the selected remote data concentrator, the activation signal instructing the selected remote data concentrator to enter or maintain the active state. In the active state, the remote data concentrator performs control of the system component. Further, the central processing unit may be configured to generate and transmit a deactivation signal to the remaining remote data concentrator(s), the deactivation signal instructing the remaining remote data concentrator(s) to enter or maintain the inactive state. In the inactive state, the remote data concentrator(s) does/do not perform control of the system component. Alternatively, the central processing unit may be configured to generate and transmit a combined activation/deactivation signal to all of the at least two remote data concentrators containing information which of the at least two remote data concentrators shall enter the active state and which of the at least two remote data concentrators shall enter the inactive state.

According to a third possible realization of the central processing unit according to the first aspect, which may be implemented independent from or in combination with at least one of the first possible realization of the central processing unit and the second possible realization of the central processing unit according to the first aspect, the control unit may be configured to receive a feedback signal from each of the at least two remote data concentrators via the network connection, the feedback signal containing information indicating a state of the system component. The feedback signal may be send out by the system component repeatedly, periodically or continuously or may be triggered by the central processing unit or the at least two remote data concentrators repeatedly, periodically or continuously, for example, using any possible clock cycle as set forth above.

The central processing unit may be configured to select the one of the at least two remote data concentrators for control of the system component by considering the information contained in the feedback signal received from each of the at least two remote data concentrators. For example, the central processing unit may compare the feedback signals received from the at least two remote data concentrators and may use the result of the comparison for selecting one of the at least two remote data concentrators. It is conceivable that the central processing unit derives from the comparison that one or more of the at least two remote data concentrators does/do not function properly and one or more others of the at least two remote data concentrators does/do function properly. The central processing unit may then select the properly working remote data concentrator or one of the properly working remote data concentrators for performing the control of the system component.

The selection of the one of the at least two remote data concentrators may be static or dynamic. In accordance with the static selection, the central processing unit may decide to select the one of the at least two remote data concentrators and may deselect the other(s) of the at least two remote data concentrators at least for a pre-determined time period. In accordance with the dynamic selection, the central processing unit may make the decision to switch between two or more of the at least two remote data concentrators repeatedly, continuously or periodically. For example, it may be conceivable that two system components are connected to each of the at least two remote data concentrators and a first of the system components properly functions with a first but not with a second of the at least two remote data concentrators and a second of the system components properly functions with the second but not with the first of the at least two remote data concentrators. In this case, the central processing may make the decision to select the first remote data concentrator for a first period of time, e.g., 50 s, and to select the second remote data concentrator for a second period of time, e.g., 50 s, following the or subsequent to the first period of time. During the first period of time, the first system component may perform certain functions as instructed and in the second period of time, the second system component may perform certain (the same or different) functions as instructed. In accordance with the dynamic selection, the first and second period of times may be smaller than a confirmation time. The confirmation time may be a time period after which an error or improper functioning of a system component is reported to a general aircraft control system.

According to a second aspect, a control network for control of an aircraft system provided on board an aircraft is provided. The control network comprises at least one central processing unit as described herein and a plurality of remote data concentrators. Each of the plurality of remote data concentrators is connected to the at least one central processing unit over a network connection. Further, at least two of the plurality of remote data concentrators are connected to a system component of the aircraft system, e.g., by way of a wireless or wired connection. Each of the at least two of the plurality of remote data concentrators is configured to control the system component in response to an instruction by the at least one central processing unit.

The at least two of the plurality of data concentrators may be connected in parallel to the single system component. In other words, the single system component may be connected to all of the at least two remote data concentrators. The system component may be connected to the at least two remote data concentrators by means of electric wires according to the specific hardware interfaces of the system component.

In addition to the single system component, which is connected to the at least two of the plurality of remote data concentrators, additional system components may be provided. At least some of the additional system components may be components of the same kind of aircraft system as the single system component and/or at least some of the additional system components may be components of a different kind of aircraft system than the single system component. Independent of the type of the additional system components, the additional system components may be controlled by at least some of the plurality of data concentrators. For this purpose, the additional system components may be connected to one or more of the plurality of remote data concentrators, e.g., by means of electric wires according to the specific hardware interfaces of the additional system components. Similarly, at least some of the plurality of remote data concentrators may respectively be connected to one or more of the additional system components. In other words, the configuration of the control network may be completely flexible as long as at least one single system component is connected to at least two remote data concentrators at the same time (in parallel). However, certainly further system components may exist in the network that need to be connected to one remote data concentrator only, rather than to at least two remote data concentrators. The decision whether to connect a system component only to one single remote data concentrator or two at least two remote data concentrators may depend on the error rate of the system component and/or the error rate of the remote data concentrators used. For example, if the error rate of the remote data concentrator is higher than the error rate of the system component, the (more reliable) system component may be connected to at least two remote data concentrators. In this way, redundancy is provided. Just to give on example for the foregoing case, the error rate of the remote data concentrator may lie around one error per 30000 hours and the error rate of the system component may lie around one error per 200000 hours. These values are, however, merely given by way of example and without limitation. If, however, the error rate of the remote data concentrator is lower than the error rate of the system component, the system component may be connected to only one single remote data concentrator.

The at least two of the plurality of remote data concentrators may be respectively configured to instruct each other to control the system component. This may be the case when two or more of the at least two remote data concentrators have been instructed by the central processing unit to perform the control of the system component. The two or more remote data concentrators which have been instructed to control the system component may then decide, e.g., by considering Boolean functions implemented in each of the remote data concentrators, which of the two or more remote data concentrators shall be responsible for the control. Based on this decision, only one of the remote data concentrators may enter the active state to perform the control of the system component. The other(s) of the two or more remote data concentrators may then enter inactive state, although instructed by the central processing unit to enter active state.

Each of the at least two of the plurality of remote data concentrators may be configured to receive a feedback signal from the system component and to forward the feedback signal to the at least one central processing unit. As described above, the feedback signal may contain information indicating a state of the system component. Considering, for instance, an electric valve as an example of a system component, the state indicated by the information contained in the feedback signal may be a position of the electric valve, e.g., the information may indicate that the electric valve is in a closed or open position or may indicate the exact position of the electric valve. The central processing unit may then instruct the selected remote data concentrator to change the state of the system component, e.g., to change the position of the electric valve from a closed to an open position.

The system component may be any kind of electric or electronic component typically used in aircraft systems, e.g., any type of sensor or actuator typically used in aircraft systems. For example, the system component may comprise or be configured as an electric valve, a temperature sensor, a pressure sensor, a mass air flow sensor, an electric fan, a proximity switch, an airflow meter, an electric motor, and the like.

The aircraft system may comprise or may be configured as an aircraft ventilation system. In this case, the system component may comprise or may be configured as a system component of the aircraft ventilation system. For example, the system component may be any kind of sensor or actuator typically used in an aircraft ventilation system. Alternatively or additionally, at least a subset or all of the plurality of remote data concentrators may comprise or may be configured as single-lane Common Remote Data Concentrators, CRDCs.

According to a third aspect, an aircraft comprising the control network as described herein is provided.

According to a fourth aspect, a method for control of an aircraft system provided on board an aircraft is provided. The method is performed by a central processing unit. The central processing unit is connectable to at least two remote data concentrators over a network connection for control of a system component of an aircraft system. The method comprises the steps of: selecting one of the at least two remote data concentrators for control of the system component; and instructing the selected remote data concentrator to control the system component.

According to a fifth aspect, a computer program is provided. The computer program comprises program code portions which, when it is loaded in a computer or a processor (for example a microprocessor, microcontroller or Digital Signal Processor (DSP)), or runs on a computer or processor (e.g., a microprocessor, microcontroller or DSP), causes the computer or processor (e.g., the microprocessor, microcontroller or DSP) to carry out the method described herein.

Even if some of the above-described aspects have been described herein in relation to the central processing unit or the control network, these aspects may also be implemented as methods or as a computer program carrying out the method. In the same way, aspects described in relation to the method may be realized by suitable units in the central processing unit or the control network or be carried out by the computer program.

BRIEF DESCRIPTION OF THE DRAWINGS

Specific embodiments of the present invention are explained below with reference to the appended schematic figures, in which.

DETAILED DESCRIPTION OF THE PREFERRED EMBODIMENTS

Hereinbelow, without being limited thereto, specific details are set out in order to provide a complete understanding of the present invention. It is, however, clear to a person skilled in the art that the present invention may be used in other embodiments which may deviate from the details set out below. Even if, by way of example, the embodiments hereinbelow are described with reference to an Avionics Full DupleX (AFDX™) switched Ethernet network connection (also often referred to as ARINC 664) as one example for a network connection, the embodiments set out below are not limited thereto, but can be used without limitation with other network connections like Control Area Network (CAN) busses, FlexRay, ARINC 429 or any future aircraft data network. Further, even if hereinbelow it is only referred to common remote data concentrators (CRDCs) it is conceivable that other single-lane remote data concentrators may be used instead, like any future single-lane remote data concentrators.

It is clear to a person skilled in the art that the explanations set out below are/may be implemented using hardware circuits, software means or a combination thereof. The software means may be associated with programmed microprocessors or a general computer, an ASIC (Application Specific Integrated Circuit) and/or DSPs (Digital Signal Processors). Moreover, it is clear that even if the details below are described with reference to a method, they may also be realized in a suitable device unit, a computer processor and a memory connected to a processor, the memory being provided with one or more programs which carry out the method when they are executed by the processor.

Figure 1:
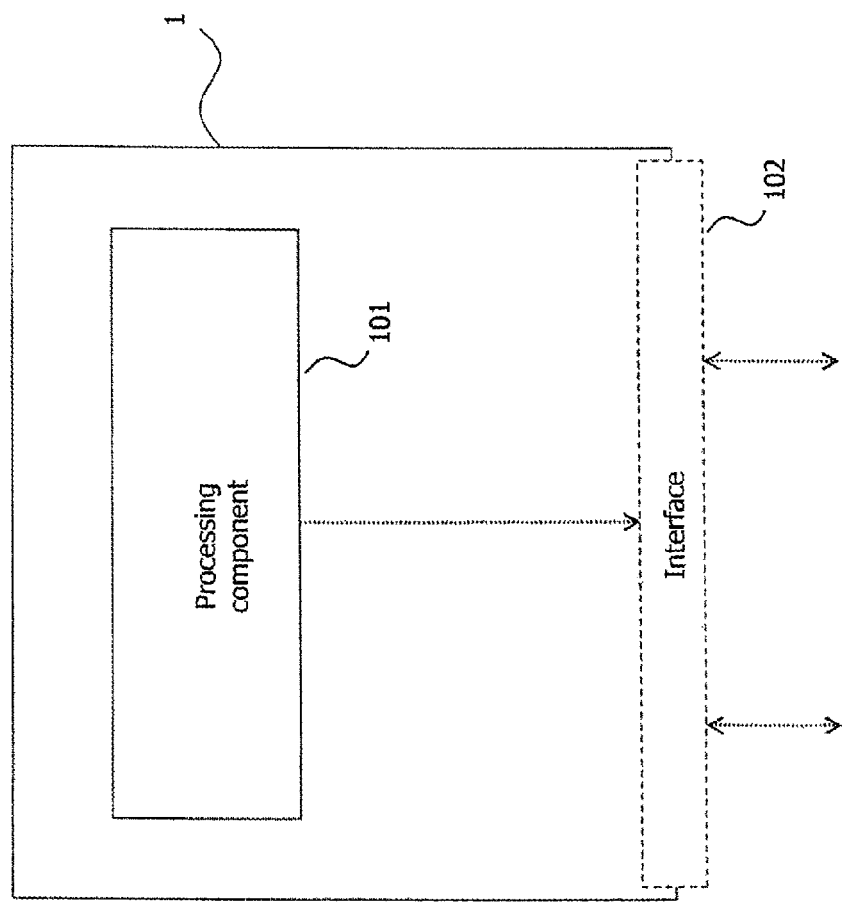
FIG. 1 shows a schematic representation of a central processing unit according to an embodiment.

FIG. 1 schematically shows a central processing unit 1 according to an embodiment. By way of example, the central processing unit 1 comprises a processing component 101 and an interface component 102. By means of the interface component 102, the central processing unit 1 can be connected to any suitable network connection (not shown in FIG. 1). As schematically illustrated in FIG. 1 by way of example by means of the dashed arrows, the interface 102 provides two input/output ports. In this way, redundancy is provided by the interface 102. A plurality of remote data concentrators (not shown in FIG. 1) may be coupled to the network connection so that the central processing unit 1 is connectable to one or more of the plurality of remote data concentrators over the network connection by means of its interface 102. The remote data concentrators themselves may respectively be coupled to one or more system components of an aircraft system as will be described in more detail below. The processing component 101 is configured to determine or select which of the remote data concentrators shall be used for control of the system component, as will also be described in more detail below.

Figure 2:
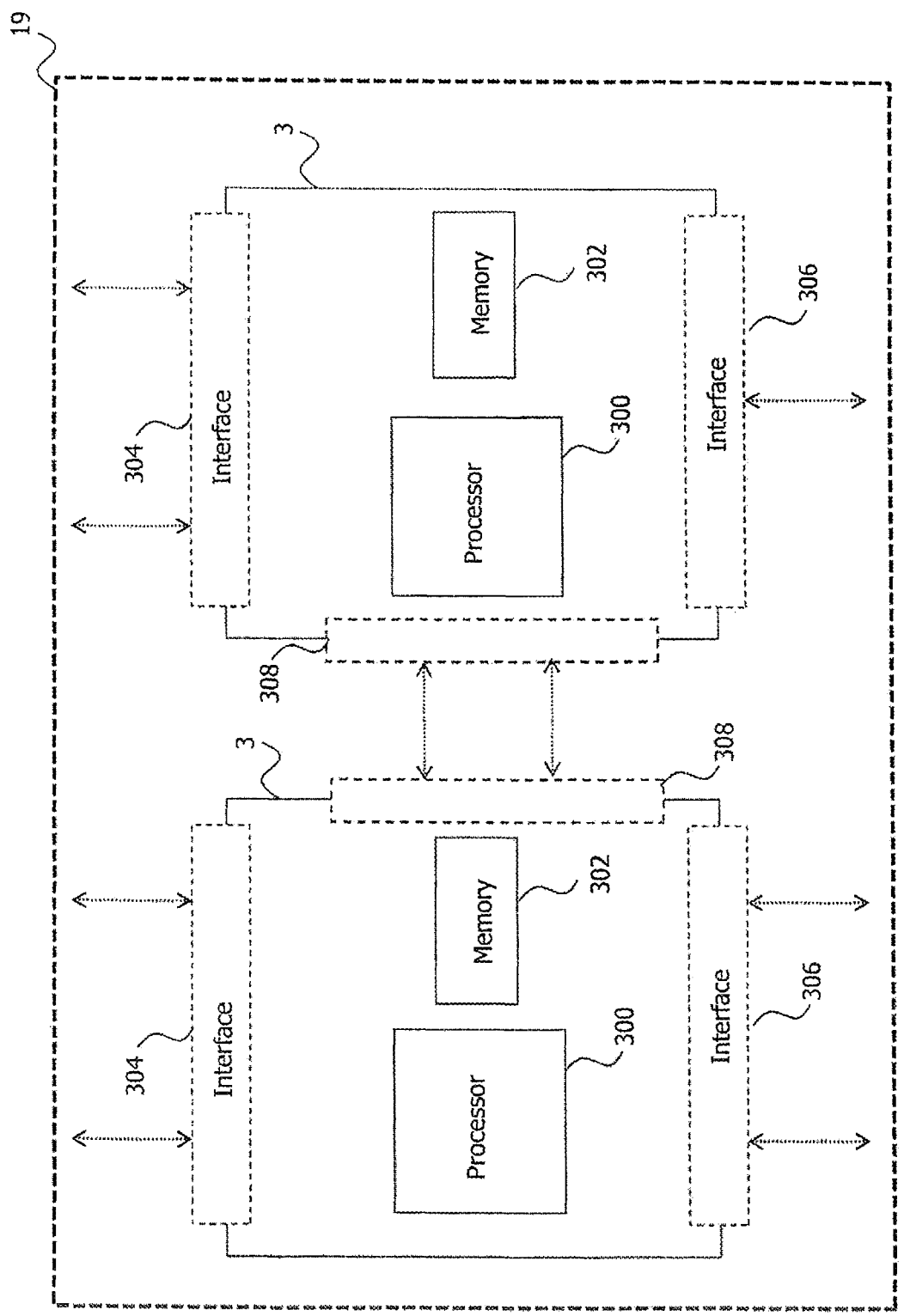
FIG. 2 shows a schematic representation of a pair of common remote data concentrators according to an embodiment.

FIG. 2 schematically illustrates a pair 19 of common remote data concentrators (CRDCs) 3 as an example of generic, single-lane and S/W configurable remote data concentrators. Both CRDCs 3 have a first interface 304 for connection to the central processing unit 1 of FIG. 1 over a network connection and a second interface 306 for connection to the system component to be controlled by means of a wired or wireless connection. The first interface 304 provides multiple input/output ports so that the CRDCs 3 can be redundantly coupled to the central processing unit 1 over the network connection. In the example of FIG. 2, the first interface 304 of both CRDCs 3 uses two input/output ports for connection to the network connection. The second interface 306 provides multiple input/output connections so that the same CRDC 3 can be coupled to more than one system component. In the example of FIG. 2, the second interface 306 of the left CRDC 3 uses two input/output ports for connection, i.e., it is coupled to two system components, and the right CRDC 3 uses only one input/output port for connection, i.e., it is coupled to only one system component. Although not shown in FIG. 2, it is conceivable that the two CRDCs 3 are coupled to the same system component in order to provide redundant control of the system component.

Optionally, each of the two CRDCs 3 may have a third interface 308 for connection to the other of the two CRDCs 3. By way of example, FIG. 2 shows that both of the CRDCs 3 have such a third interface 308 with multiple input/output ports (in FIG. 2, two are in use by way of example) via which the CRDCs 3 can communicate with each other. Further, both CRDCs 3 have a processor 300 for performing control and other simple processing functions and a memory 302 in which certain control and simple processing commands may be stored and retrieved from by the processor 300.

Figure 3:
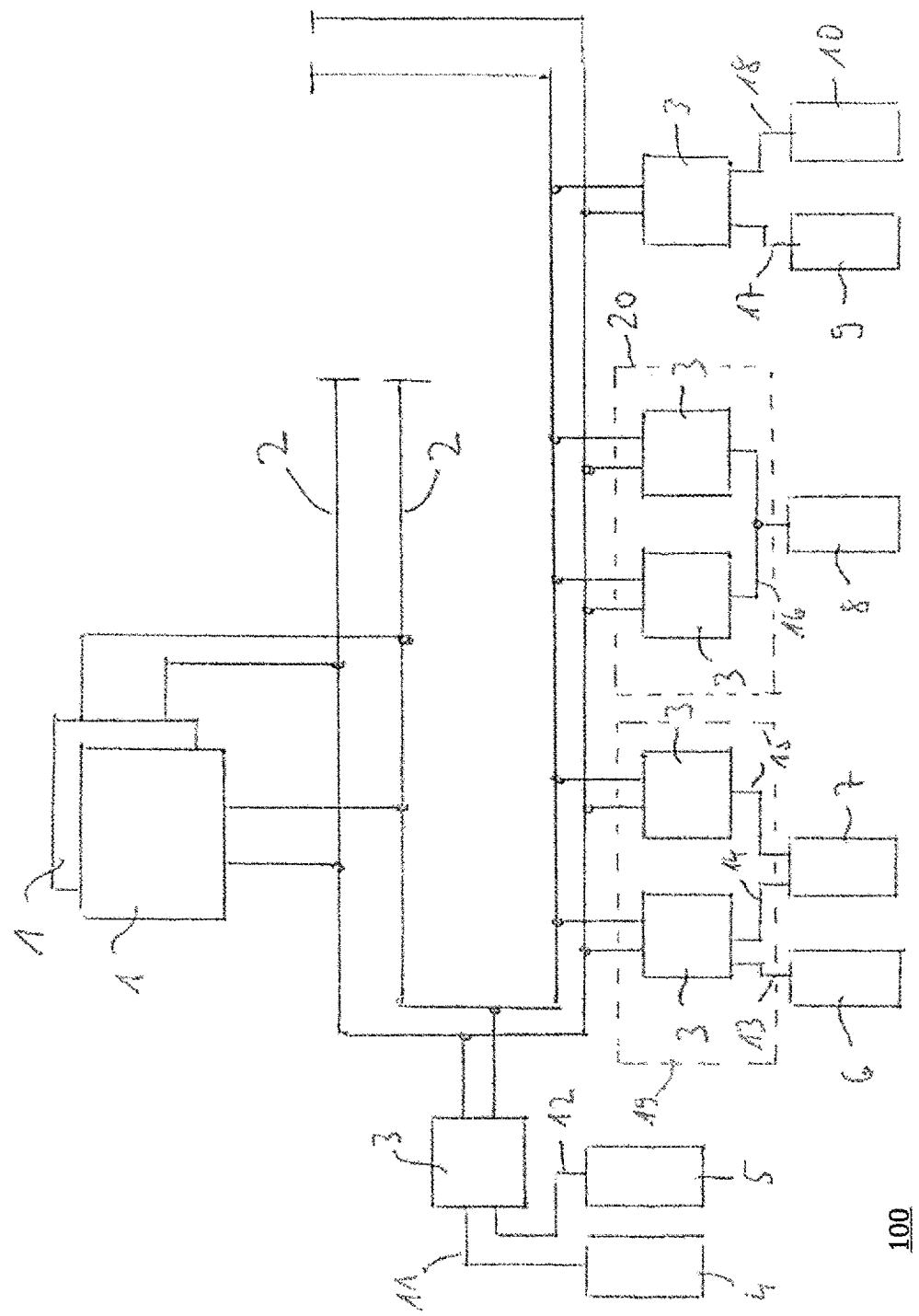
FIG. 3 shows a schematic representation of a control network according to an embodiment.

FIG. 3 schematically shows a control network 100 according to an embodiment. By way of example, the control network 100 comprises two single-lane central processing units 1 which are respectively connected to an AFDX network connection 2 as an example for a network connection. By way of example, it is in the following assumed that the central processing units 1 of FIG. 3 are configured in the way as described with respect to FIG. 1. Further, by way of example, six CRDCs 3 are provided in the control network 100 of FIG. 3 to illustrate that a plurality of CRDCs 3 can be provided in the control network 100. In other words, the number of six CRDCs 3 is merely exemplary and the control network 100 can comprise any number of two or more CRDCs 3.

Still further, seven system components 4 to 10, are exemplarily shown to illustrate any conceivable plurality of ventilation system components to be controlled. In the following, it is assumed without limitation that the system components 4 to 10 are configured as ventilation system components 4 to 10, i.e., the aircraft system to be controlled is exemplarily assumed to be an aircraft ventilation system. However, the configuration of FIG. 3 is not limited thereto, but other system components (e.g., sensors and/or actuators) typically provided in aircraft systems may be controlled by means of the arrangement of FIG. 3. In the example of FIG. 3, the ventilation system components 4 to 10 are connected to the CRDCs 3 by means of electric wires 11 to 18.

As can be further seen in FIG. 3, two pairs 19, 20 of CRDCs 3 are formed, as generally described with respect to FIG. 2. More specifically, the pair 19 of CRDCs 3 corresponds to the pair 19 as described with respect to FIG. 2. The other pair 20 of CRDCs 3 is configured differently in that both CRDCs 3 of the pair 20 are connected only to one single ventilation system component 8, whereas in the pair 19 one of the CRDCs 3 is connected to two ventilation system components 6, 7. As can be seen from FIG. 3, the ventilation system component 7 is coupled to both (all) of the CRDCs 3 of the pair 19 and the ventilation system component 8 is coupled to both (all) of the CRDCs 3 of the pair 20. In this way, redundancy is provided for the safety critical ventilation system components 7, 8. The other ventilation system components 4, 5, 6, 9, 10 are exemplarily assumed to not perform safety relevant operations and are therefore coupled to only one CRDC 3 (independent of the CRDC 3 being one of a pair 19, 20 or a single CRDC 3 not being part of the pairs 19, 20).

For sake of simplicity, the operation of the control network 100 is in the following only explained with respect to the pair 19 of CRDCs 3. However, the following equally applies also to the other pair 20.

The central processing unit 1 in use (the other one may be considered redundant) selects which CRDC 3 of the pair 19 of CRDCs 3 shall be used for controlling the ventilation system component 7 coupled to both CRDCs 3 of the pair 19. The central processing unit 1 sends out a corresponding instruction (e.g., in the form of a command signal) for example via its interface 102, over the AFDX network connection 2 to one or both CRDCs 3 of the pair 19. For example, the central processing unit 1 sends out a command signal to both CRDCs 3 of the pair 19 instructing one CRDC 3 of the pair 19 that it shall be responsible for control of the ventilation system component 7 and instructing the other CRDC 3 of the pair 19 to not be responsible for control. Alternatively, the central processing unit 1 sends out a command signal to one CRDC 3 of the pair 19 instructing the one CRDC 3 of the pair 19 that it shall be responsible for control of the ventilation system component 7 and sends out a command signal to the other CRDC 3 of the pair 19 instructing the other CRDC 3 of the pair 19 to not be responsible for control. It is conceivable that the central processing unit 1 sends out a command signal instructing the one CRDC 3 of the pair 19 to enter an active state and instructing the other CRDC 3 of the pair 19 to enter an inactive state. When in active state, the respective CRDC 3 knows that it is responsible for control. When in inactive state, the respective CRDC 3 knows that it is not responsible for control. The selection performed by the central processing unit 1 can be based on various criteria, for example, based on the availability of the CRDCs 3 of the pair 19, the power supply characteristics of the CRDCs 3 of the pair 19 and so on. The selection process may be performed repeatedly or continuously or periodically, e.g., every 100 milliseconds.

The CRDCs 3 may further communicate with each other, as mentioned with respect to FIG. 2, via a third interface 308 and may instruct each other to deviate from the instruction of the central processing unit 1. For example, the CRDCs 3 may communicate via each other after being instructed by the central processing unit 1 and may determine that both CRDCs 3 of the pair 19 have been instructed to control the ventilation system component 7. In this case, the CRDCs 3 may negotiate that only one of them should be responsible for control of the ventilation system component 7, while the other is not.

The CRDCs 3 further receive a feedback signal from the respective system components via their second interfaces 306 and may forward the feedback signal to the central processing unit 1 via their first interfaces 304 and the AFDX network connection 2. The feedback signal may contain information indicating a state of the ventilation system component 7. The central processing unit 1 may further consider the information contained in the feedback signal for the selection which of the CRDCs 3 shall be responsible for the control for the ventilation system component 7.

By means of the control network described herein, a large number of equal local CRDCs 3 may be used, which may be distributed over the entire fuselage of the aircraft, in accordance with the location of the system components 4 to 10. In this way, each system component 4 to 10 may be connected to its closest CRDC 3, which ensures short wiring lengths. As for automation and control of the aircraft system, many local CRDCs 3 may be used, rather than only some central controllers, each CRDC 3 offering remaining capabilities for its simultaneous use by other aircraft systems. This solution allows other aircraft systems to access the same CRDCs 3 that are used, e.g., by the ventilation system, in order to likewise optimize their control architecture in terms of overall wiring lengths. As the CRDCs are S/W configurable, different available input/output ports and interfaces of the CRDCs 3 may be arbitrarily activated and assigned for specific use by the aircraft systems.

The control network 100 includes not only single CRDCs 3, but also pairs 19, 20 of CRDCs 3 for control and monitoring of (ventilation) system components 4 to 10. As some of the components 4 to 10 need redundant control due to reliability reasons, such components, e.g., components 7, 8, are connected in parallel to two CRDCs 3. This solves the problem that redundant control mechanisms are required for a lot of ventilation system components 4 to 10, even though each CRDC 3 has only one control lane. The control network 100 also includes redundancy management of CRDC-pairs 19, 20 by the ventilation control software applications running on the central processing units 1. The redundancy management reacts according to the temporal availability of CRDCs 3 of one CRDC-pair 19, 20. For this, the control software commands a CRDC 3 of one pair 19, 20 as active whereas the other one is commanded to be inactive.

Safety critical control functions of the ventilation system may be implemented in the central processing unit 1 and additionally on the CRDCs 3 which themselves can execute Boolean functions which can be user-defined through the CRDC S/W configuration. By this means, the control network 100 offers two independent implementations of safety critical ventilation control functions and thus complies to their safety requirements.

With the above described embodiments, the development of specific controllers for control and monitoring of ventilation system components 4 to 10 can be completely avoided. Hence, airliners do not need to keep specific ventilation controllers as spare parts on stock.

Further, customer specific adaptions of the ventilation system, i.e., modifications of the system architecture and resulting changes of the set of necessary sensors and actuators and their control and monitoring can be handled in a more flexible way as previously by adaption of the CRDCs S/W configuration.

Due to the fact that a large number of equal local CRDCs 3 which are distributed over the entire fuselage of the aircraft may be used for automation of the ventilation system, the ventilation system needs less wiring than with conventional central system automation solutions. Furthermore, wiring can be optimized by varying the assignment of system components to CRDCs 3. Typically, CRDCs 3 with the shortest distance to a system component 4 to 10 to be connected should be used to control and monitor that component.

CRDCs 3 and central process computers (the central processing units 1) are connected to the available common avionics data communication network according to the ARINC 664 standard or the like. Consequently, the entire communication between the central processing units 1 for the ventilation system and CRDCs 3 can be done via an AFDX network 2, without the need of dedicated data busses for the communication between ventilation system controllers 4 to 10. Nevertheless, also dedicated data busses may be used instead or in addition. Still further, applying the distributed control architecture for automation of the ventilation system, many CRDCs 3 are involved offering a higher capacity of connectable components 4 to 10 as used by the ventilation system. Remaining free input-/output interfaces 306 of CRDCs 3 can be used by other aircraft systems for further different control and monitoring applications.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A central processing unit for control of an aircraft system provided on board an aircraft, comprising:
   the central processing unit being doubly connected to at least two generic, single-lane and software configurable remote data concentrators over a network connection for control of a system component of the aircraft system,
   wherein the central processing unit is configured to select a one of the at least two remote data concentrators for control of the system component by considering which of the at least two remote data concentrators has the most robust power supply and by considering availability of the at least two remote data concentrators, and to instruct the one of the at least two remote data concentrators to control the system component, and,
   wherein each of the two generic, single-lane and software configurable remote data concentrators are connected to the system component of the aircraft system.

2. The central processing unit according to claim 1, wherein the central processing unit is configured to instruct the selected remote data concentrator to control the system component by commanding the selected remote data concentrator to enter or maintain an active state and by commanding the remaining of the at least two data concentrators to enter or maintain an inactive state.

3. The central processing unit according to claim 1, wherein the central processing unit is configured to receive a feedback signal from each of the at least two remote data concentrators via the network connection, the feedback signal containing information indicating a state of the system component.

4. The central processing unit according to claim 3, wherein the central processing unit is configured to select the one of the at least two remote data concentrators for control of the system component by considering the information contained in the feedback signal received from each of the at least two remote data concentrators.

5. A control network for control of an aircraft system provided on board an aircraft, the control network comprising:
   at least one central processing unit for control of the aircraft system provided on board an aircraft, comprising:
   the central processing unit being doubly connected to at least two generic, single-lane and software configurable remote data concentrators over a network connection for control of a system component of an aircraft system,
   wherein the central processing unit is configured to select a one of the at least two remote data concentrators for control of the system component by considering which of the at least two remote data concentrators has the most robust power supply and by considering availability of the at least two remote data concentrators, and to instruct the one of the at least two remote data concentrators to control the system component; and a plurality of remote data concentrators, wherein each of the plurality of remote data concentrators is connected to the at least one central processing unit over a network connection and at least two of the plurality of remote data concentrators are connected to a system component of the aircraft system, wherein each of the at least two of the plurality of remote data concentrators is configured to control the system component in response to an instruction by the at least one central processing unit, and, wherein each of the two generic, single-lane and software configurable remote data concentrators are connected to the system component of the aircraft system.

6. The control network according to claim 5, wherein the at least two of the plurality of data concentrators are connected in parallel to the system component.

7. The control network according to claim 5, wherein the at least two of the plurality of remote data concentrators are respectively configured to instruct each other to control the system component.

8. The control network according to claim 5, wherein each of the at least two of the plurality of remote data concentrators is configured to receive a feedback signal from the system component and to forward the feedback signal to the at least one central processing unit, the feedback signal containing information indicating a state of the system component.

9. The control network according to claim 5, wherein the aircraft system comprises or is configured as an aircraft ventilation system, and the system component comprises or is configured as a system component of the aircraft ventilation system.

10. The control network according to claim 5, wherein at least a subset of the plurality of remote data concentrators comprises or is configured as a single-lane Common Remote Data Concentrator.

11. An aircraft comprising the control network according to claim 5.

12. A method for control of an aircraft system provided on board an aircraft, the method being performed by a central processing unit, the central processing unit being doubly connected to at least two generic, single-lane and software configurable remote data concentrators over a network connection for control of a system component of the aircraft system, wherein the method comprises the steps of:

selecting a one of the at least two remote data concentrators for control of the system component by considering which of the at least two remote data concentrators has the most robust power supply and by considering availability of the at least two remote data concentrators; and instructing the one of the at least two remote data concentrators to control the system component, wherein each of the two generic, single-lane and software configurable remote data concentrators are connected to the system component of the aircraft system.

13. A non-volatile computer-readable recording medium comprising instructions for performing the steps of claim 12.

* * * * *